United States Patent [19]
Yuki

[11] Patent Number: 5,809,304
[45] Date of Patent: Sep. 15, 1998

[54] METHOD OF DESIGNING APPLICATION-ORIENTED PROGRAM

[75] Inventor: Junichi Yuki, Sakura, Japan

[73] Assignee: JR East Japan Information Systems Co., Inc., Japan

[21] Appl. No.: 532,819

[22] PCT Filed: Jul. 12, 1995

[86] PCT No.: PCT/JP95/01391

§ 371 Date: Jun. 3, 1996

§ 102(e) Date: Jun. 3, 1996

[87] PCT Pub. No.: WO96/02033

PCT Pub. Date: Jan. 25, 1996

[30] Foreign Application Priority Data

Jul. 12, 1994 [JP] Japan ................................ 6-182906

[51] Int. Cl.⁶ ........................................... G06F 9/44
[52] U.S. Cl. ............................................ 395/701
[58] Field of Search ................................. 395/701

[56] References Cited

U.S. PATENT DOCUMENTS 5,564,053 10/1996 Yuki et al. .............................. 395/701

FOREIGN PATENT DOCUMENTS

| 3286226 | 12/1991 | Japan | G06F 9/06 |
| 4172529 | 6/1992 | Japan | G06F 9/06 |
| 5233239 | 9/1993 | Japan | G06F 9/06 |
| 5233242 | 9/1993 | Japan | G06F 9/06 |

*Primary Examiner*—Emanuel Todd Voeltz
*Assistant Examiner*—John Q. Chavis
*Attorney, Agent, or Firm*—Joseph W. Berenato, III

[57] ABSTRACT

A program designing method which makes it possible to efficiently design an application-oriented program without errors irrespective of levels of technical skills of engineers. In this program designing method, all types of definition items which are processed by a processing system for specific business use are extracted. Program segments (ASL) with a single function are generated in a form in which a corresponding definition item is used as a keyword and ASLs are control-independent of each other in such a way that each definition item is associated with one ASL. A control program (FAL) is separately generated which combines ASLs with each other in an organic manner by operating and controlling the group of ASLs. Each necessary ASL is activated by use of an array of a plurality of link statements included in FAL, and a source program which satisfies required business processing functions is produced by merging FAL and ASL into one. In this program designing method, when FAL necessary for the system is generated, a necessary FAL configuration is extracted from the previously generated maximum FAL configuration, and each FAL is produced from the thus extracted FAL configuration. By use of a link statement sequence of an FAL program which is determined by a link statement matrix and semantic values included in that matrix, FAL and ASL are merged into one to produce an object source program.

4 Claims, 20 Drawing Sheets

| Starting point \ End point | A | B | C |
|---|---|---|---|
| A | 2 1 | 2 2 | 2 3 |
| B | 2 4 | 2 5 | 2 6 |
| C | 2 7 | 2 8 | 2 9 |

| Starting point \ End point | A (input 1) | B (input 2) | C (output 1) |
|---|---|---|---|
| A (input 1) | 1. Self-check is effected as to whether or not data A are to be processed | 2. Whether or not B is made to act depending on the state of data obtained in 1 is checked Access key is generated | 9. A edits C |
| B (input 2) | 4. Whether or not data are to be processed is checked for both data A and data B | 3. Self-check is effected as to whether or not data B are to be processed | 8. B edits C |
| C (output 1) | 6. ——— | 7. ——— | 5. C carries out editing by itself |

Fig.16

| Starting point \ End point | Semantic definition element input | Syntax definition element |
|---|---|---|
| Semantic definition starting point | <u>31</u><br>[S1 concept]<br>[S2 concept]<br>[S3 concept] | <u>32</u><br><br>[S2 concept]<br>[S3 concept] |
| Syntax definition element | <u>34</u><br><br>[S2 concept]<br>[S3 concept] | <u>33</u><br><br>[S2 concept]<br>[S3 concept] |

| Starting point \ End point | Syntax definition element A | Syntax definition element B |
|---|---|---|
| Syntax definition element A | <u>41</u><br>[S2 concept]<br>[S3 concept] | <u>42</u><br>[S2 concept]<br>[S3 concept] |
| Syntax definition element B | <u>44</u><br>[S2 concept]<br>[S3 concept] | <u>43</u><br>[S2 concept]<br>[S3 concept] |

| Starting point \ End point | Syntax definition element | Semantic definition element output |
|---|---|---|
| Syntax definition element | 51<br>S2 concept<br>S3 concept | 52<br>S2 concept<br>S3 concept |
| Semantic definition element output | 54<br>S2 concept<br>S3 concept | 53<br>S2 concept<br>S3 concept |

FIG. 24

| | input 1 | input 2 | ... | input n | output 1 | output 2 | ... | output m |
|---|---|---|---|---|---|---|---|---|
| input 1 | S/V | S/V | | S/V | S/V | S/V | | S/V |
| input 2 | S/V | S/V | | S/V | S/V | S/V | | S/V |
| ... | | | | | | | | |
| input n | S/V | S/V | | | S/V | S/V | | S/V |
| output 1 | S/V | S/V | | S/V | S/V | S/V | | S/V |
| output 2 | S/V | S/V | S/V | S/V | S/V | S/V | | S/V |
| ... | | | | | | | S/V | S/V |
| output m | S/V | S/V | | S/V | S/V | S/V | | S/V |

FIG. 25

| End point \ Starting point | X(1) | X(2) | X(3) | --- | X(n) | X(n+1) ~ X(n+m) |
|---|---|---|---|---|---|---|
| X(1) | 1 | $n$ | $n-1$ | --- | $n^2$ | $n^2+2nm+1$ ~ $n^2+(2n+1)m$ |
| X(2) | $2n$ | $n+1$ | $2n-1$ | --- | $n^2-1$ | $n^2+(2n-1)m+1$ ~ $n^2+2mn$ |
| X(3) | $3n$ | $3n-1$ | $2n+1$ | --- | $n^2-2$ | $n^2+(2n-2)m+1$ ~ $n^2+(2n-1)m$ |
| --- | --- | --- | --- | | --- | ← |
| X(n) | $n^2$ | $n^2-1$ | $n^2-2$ | --- | $n(n-1)+1$ | $n^2+(n+1)m+1$ ~ $n^2+(n+2)m$ |
| X(n+1) ~ X(n+m) | $n^2+m+1$ ~ $n^2+2m$ | $n^2+2m+1$ ~ $n^2+3m$ | $n^2+3m+1$ ~ $n^2+4m$ | ↗ | $n^2+nm+1$ ~ $n^2+(n+1)m$ | $n^2+1$ ~ $n^2+m$ |

METHOD OF DESIGNING APPLICATION-ORIENTED PROGRAM

TECHNICAL FIELD

This invention relates to a method of designing a program for implementing an application-oriented business processing system.

BACKGROUND OF THE INVENTION

When an individual program for specific business use is developed, the person in charge of developing the program (hereinafter referred to as a programmer) works closely with a user for the program to be made in order to understand business requirements relating to that program. These requirements are reflected in the program. In such a case, the programmer must have complete knowledge of the user's business. Specifically, it has been necessary to describe the requirements of the business in the form of a flowchart, and the accurate knowledge of the business was required to describe the flowchart.

However, it is impossible for the programmer to acquire the complete knowledge of the user's business, and hence a disparity in business knowledge between the user and the programmer sometimes brings about the following problems:

1) A user cannot accurately portray requirements for system implementation.
2) There arises a difference in perception between the user and the programmer.
3) It takes a long time to work with the user to accurately understand business requirements.
4) Variables of the business requirements delays the development;
5) It is necessary to prepare more documents than are required in addition to an object program.
6) It is difficult to flexibly and quickly address modifications to the business requirements.

Further, engineers who have different levels of technical expertise and skills design programs based on their respective experience at a practical software development site. As a result of this, the following problems arise:

1) Results (documents and programs) differ depending on the engineer.
2) The difference among engineers is liable to bring about a disparity in comprehension and communication regarding the result.
3) The changing of the engineer causes the progress of work to be slow.

In the conventional preparation work of a program, details of the program are designed with many variables left unsolved, and the variables are examined while the designing of the detailed part is in progress. These operations are repeatedly carried out, and hence the program is inevitably prone to be designed in a bottom-up manner. For this reason, if specifications of the requirements are changed during the course of the designing, the detailed logic which has already been designed will often be changed corresponding to the change of the specifications, thereby resulting in illogical and inefficient work. The thus generated program differs depending on the engineer, which causes many problems concerning systems management such as maintenance and modifications.

To solve these problems, the inventor of the present invention put forward a revolutionary development technique, as disclosed in Unexamined Japanese Patent Publication No. Hei-6(1994)-332678, which fundamentally alters the conventional program designing method. As disclosed in this patent publication, in a method of designing an application-oriented program, a logical element is constructed into a two-level hierarchy which consists of a control logic (Frame of Applicational Logic; FAL) and an application processing logic (Applicational Segment of Logic; ASL). An FAL program which does not contain the application processing logic and an ASL program which only includes the application processing logic are essentially generated separately from each other. An object program is produced by merging these two programs into one.

The present invention is based on this development method disclosed in the above mentioned patent publication. Accordingly, the outline of the above development method will be explained prior to the description of a method of designing an application-oriented program according to the present invention.

The two-level hierarchy is based on three concepts; namely, a definition element concept, an FAL concept, and an ASL concept. The definition element is an aggregate of definition items (application languages) collected in a definite range. The form of FAL is determined by the definition element, and ASL is based on the definition items belonging to the definition element. Details of each of these three concepts can be decided in parallel in such a way that they are independent of each other. An object program is produced by merging FAL and ASL into one. The definition element comprises seven types of item, i.e., a screen, forms, data files, master files, inherent FAL tables, inherent ASL tables, and common tables.

The control logic FAL is made up of branch route sorting logic and a link statement which activates the application processing logic ASL. FAL is logic which controls the definition element and does not contain any application processing logic at all, thereby resulting in simple logic design.

The application processing logic ASL is a logic element only for application processing purposes. ASL extracts a definition item which is item name given to each of the types of definition items to be processed, and generates a program segment with a single function for each definition item in the form in which a corresponding definition item is used as a keyword and the segments are control-independent of each other. FAL sequences ASL.

In this way, the logic element is constructed into a two-level hierarchy consisting of the FAL program layer which is not affected by contents of the data item assigned to the definition item, and the ASL program layer for each definition item which is relevant to contents of each data item. The FAL program layer excludes the processing of data relating to definition items which include many variables, and therefore the program structure of the FAL program becomes very easy to comprehend and see through. Further, the FAL program is not affected by modification of details of required specifications. By virtue of this, the productivity of the FAL program layer becomes extremely improved, and variations in quality are reduced.

The ASL program layer is an aggregate of small sized program segments which have a signal function using a definition item as a keyword and are independent of each other, and hence logical contents of each segment become extremely simple. As a result of this, it becomes easy to prepare each segment, which in turn prevents variables in quality. It is easy to cope with the modification of the details of the required specifications by simply changing a corresponding program segment without changing the overall program. An object program (a source program) is prepared by merging thus independently prepared FAL and ASL into one. In this way, the previously mentioned Unexamined Japanese Patent Publication discloses the program designing method which is easy for many engineers to practice, makes it possible to efficiently manufacture an application-oriented program irrespective of a level of a technical skill of each engineer, and further enables a computer to automatically generate a program.

DISCLOSURE OF THE INVENTION

The object of the present invention is to provide a method of designing an application-oriented program, based on the above mentioned development technique, which allows design steps to be further automated and improves the inherency of a program obtained as a result of the automation of the design steps.

The above object is achieved by an application-oriented program designing method of the present invention including the steps of:

extracting each definition item which is processed by an application processing system for specific application, generating a program segment (ASL) with a single function in the form in which a corresponding definition item is used as a keyword and ASLs are control-independent of each other in such a way that the program segment is associated with each of the definition items, separately generating a control program (FAL) which combines ASLs with each other in an organic manner by operating and controlling the group of ASLs, and producing a source program which satisfies a required application processing function by starting each necessary ASL using an array of link statements included in FAL, and by merging ASL and FAL into one, wherein the improvement being characterized by comprising the steps of:

extracting an FAL configuration necessary for a specific application from the previously generated maximum FAL configuration when FAL necessary for the processing system is generated; and generating each FAL from the thus extracted FAL constitution.

The maximum FAL configuration is an aggregate of a plurality of FAL data streams. The FAL data streams are generated by: dividing FAL into three types, that is, FAL (F1) which controls an original input, FAL (F2) which processes input data for a certain purpose, and FAL (F3) which produces a final output, as an element which gives the order of the occurrence of events to a definition element made of an aggregate of the definition items; interposing F1 between a first definition element and a second definition element, F2 between the second definition element and a third definition element, and F3 between the third definition element and a fourth definition element.

The array of a plurality of link statements included in FAL which is used for merging FAL and ASL into one is automatically determined by: generating a link statement matrix from the aggregate of definition elements consisting of all input and output definition elements associated with one FAL in such a way that each combination of a pair of definition elements is arranged corresponding to each box of the link statement matrix in order to provide all combinations of the pair of definition elements obtained as a result of duplicate permutation, in which one of the definition element pair serves as a logical starting point and the other as a logical end point; storing each semantic value including a plurality of link statements univocally, each of which is determined by the combination of a definition element serving as a logical starting point with another definition element serving as a logical end point, in each of boxes of the link statement matrix; and concatenating the semantic values with each other in a predetermined order.

One semantic value is made of a plurality of link statement unit sequences each of which includes a plurality of link statements and branch instructions to implement one data action function.

The predetermined order for concatenating the semantic values which form the link statement mesh is univocally set based on a generation equation.

The generation of a program by dividing a logical element into FAL which does not include an application processing logic and ASL which includes only application processing logic makes the structure of each of FAL and ASL very simple and also enables the generation of FAL and ASL to proceed separately from each other.

FAL does not include the application processing logic, and hence it is possible to previously estimate the maximum FAL configuration irrespective of each application process. The best FAL configuration can be mechanically obtained by extracting an FAL configuration necessary for a specific development event from the maximum FAL configuration.

The FAL data stream forms a unit of the software structure, and the maximum FAL configuration is obtained by the collection of the FAL data streams. As a result of this, the most stable number of FAL streams and the location of the definition element can be defined.

By the use of a link statement matrix which is univocally generated based on all input and output definition elements of a corresponding FAL, an FAL program including a link statement array for merging FAL and ASL into one is mechanically, i.e., automatically, determined.

BRIEF DESCRIPTION OF THE DRAWINGS

FIG. 16 is a table showing one example of specific contents of application requirements of each box of the link statement matrix;

FIG. 24 is a table showing a link statement matrix applied to general FAL which includes a number of inputs "n" and a number of outputs "m"; and FIG. 25 is a table showing the order of concatating together semantic values contained in the boxes of the link statement matrix.

BEST MODE OF REALIZING THE INVENTION

With reference to the accompanying drawings, one preferred embodiment of the present invention will be described in detail.

FAL which is a program linking the previously mentioned ASLs in an organic manner has the following three categories in order to give the order of the occurrence of events to a definition element, and all FALs can be grouped together within these categories.

Specifically,

1) Data registration mechanism: F1 (FAL which controls an original input);

2) Data edition mechanism: F2 (FAL which processes input data for a certain purpose); and 3) Data generation mechanism: F3 (FAL which produces a final output).

The fist data registration mechanism F1 is a program logic which receives more than one definition element and outputs more than one definition element, and each input definition element necessarily comprises more than one semantic definition elements. The semantic definition element is a definition element on the human side of a man-machine interface (MMI). For example, an input screen, output forms, and EUC files fall within this category. It is possible for a person to directly reflect their will in this definition element.

The data edition mechanism F2 is a program logic which receives more than one syntax definition element and outputs only one syntax definition element. The syntax definition element is a definition element on the machine side of the MMI. In other words, the syntax definition element is an internal definition element maintained and managed by program logic. It is impossible for a person to directly reflect their will in this syntax definition element.

Finally, the data generation mechanism F3 is a program logic which receives more than one definition element and output more than one definition element.

Figure 1:
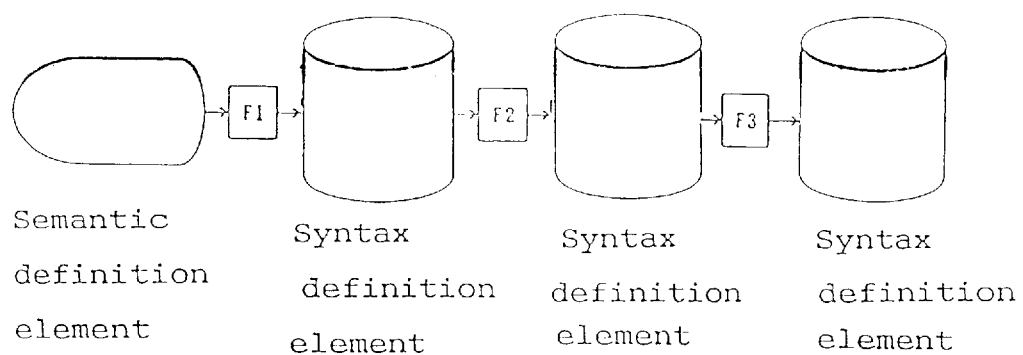
FIG. 1 is a diagram showing the configuration of an FAL data stream according to the present invention.

As shown in FIG. 1, these three types of FAL (F1, F2, F3) are linked together via a total of four definition elements which follow logic satisfying conditions for each of the categories, which constitutes a unit of the software structure. This is defined as an FAL data stream. Assuming that four locations of the definition elements are represented by definition 1, definition 2, definition 3, and definition 4, it is possible to represent the FAL data stream by definition 1→F1→definition 2→F2→definition 3→F→3 definition 4. The definition 1 is a semantic definition element, and definitions 2, 3, and 4 are syntax definition elements. Particularly when the omission of definition elements does not involve misunderstanding, the FAL data stream is simply represented by F1, F2, and F3. The collection of these FAL data streams serving as a unit makes it possible to define the most stable number of FALs and locations of definition elements which comprise the maximum development event with reference to one input point.

The FAL data stream shown in FIG. 1 is a basic form of the FAL data stream consisting of four definition elements linked together, but the following abbreviated forms are also envisaged depending on conditions.

If it is decided that F2 of the FAL data stream receives no input from another system when a semantic definition element is input to the system, the FAL data stream will be expressed as Definition 1→F1→definition→F3→definition 4 or definition 1→F1→definition 3→F3→definition 4

If it is decided that F2 of the FAL data stream receives no input from another system and F3 of the same receives no input from its own system when a semantic element is input to the system, the FAL data stream will be described as follows:

Definition 1→F1→definition 4

On the other hand, if a syntax definition element is input to the system, the FAL data stream will be expressed as below.

Definition 4→F2→definition 3→F3→definition 5.

The definition 4 is a syntax definition element and represents an output definition element of F3 which has already been allocated in the computer. The definition 5 represents a syntax definition element or a semantic definition element the user needs.

If it is decided that there is no input from another system, the FAL data stream which inputs a syntax definition element will be expressed as follows.

Definition 4→F3→definition 5

By summarizing the above descriptions, it turns out that the FAL data stream will have the following five forms:

1) F1, F2, F3 (Definition 1→F1→definition 2→F2→definition 3→F3→definition 4),

2) F1 (Definition 1→F1→definition 4),

3) F1, F3 (Definition 1→F1→definition 2→F3→definition 4→or Definition 1→F1→definition 3→F3→definition 4), 4) F2, F3 (Definition 4→F2→definition 3→F3→definition 5), and 5) F3 (Definition 4→F3→definition 5).

Figure 2:
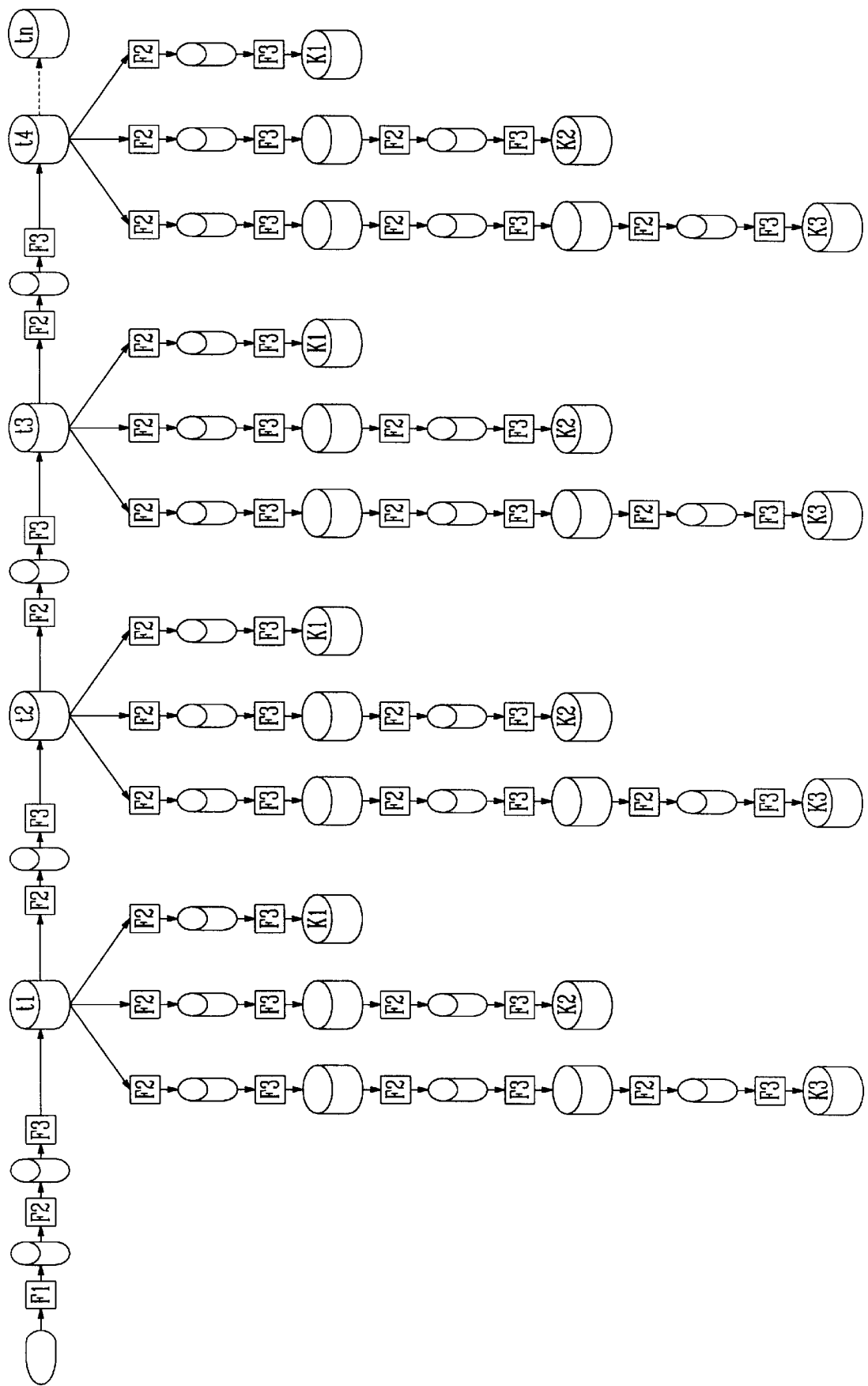
FIG. 2 is a schematic representation showing the maximum FAL configuration according to the present invention.

FIG. 2 is a diagram showing the maximum FAL configuration, and F3 is a block diagram centered with respect to a split definition element of the FAL configuration.

Figure 3:
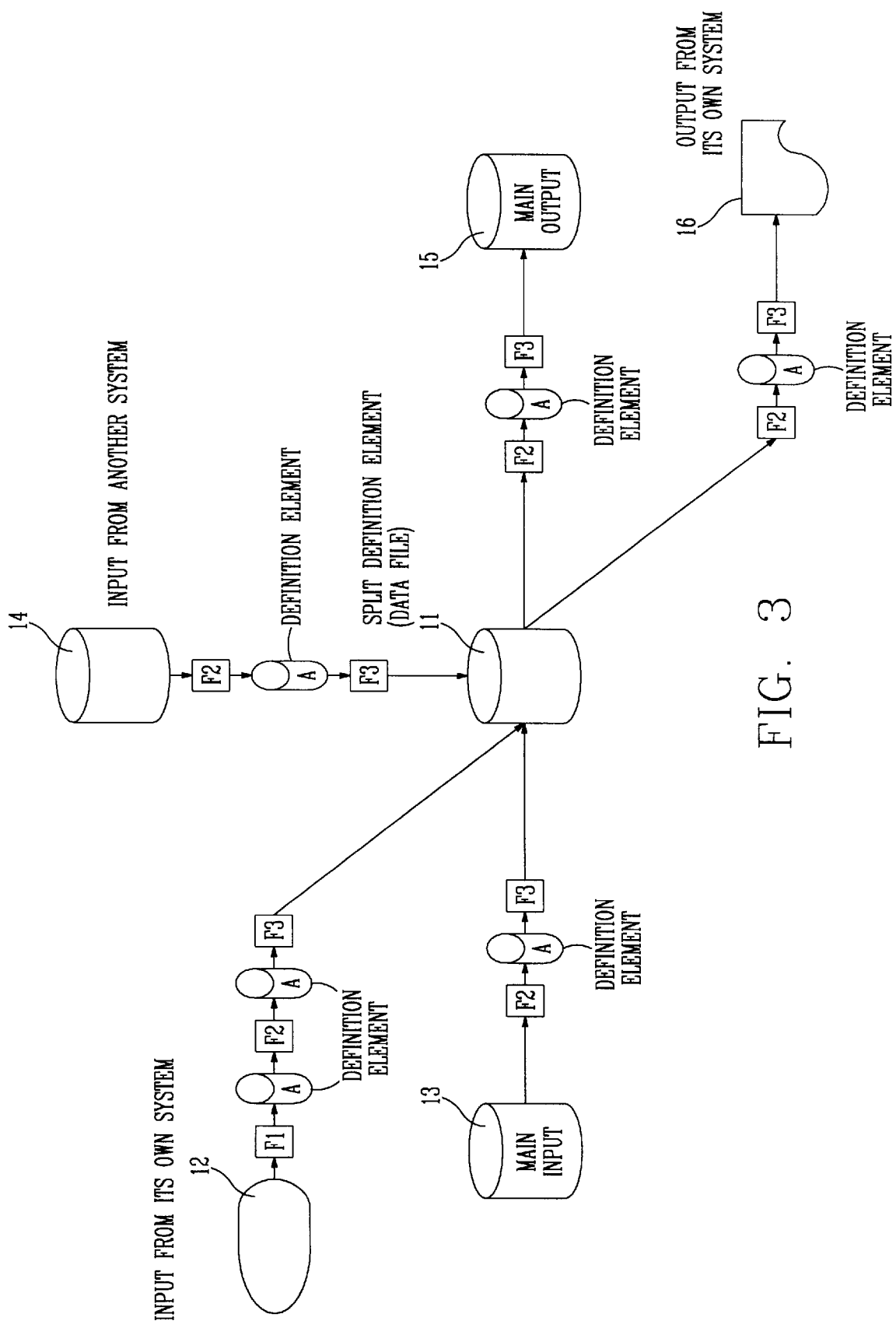
FIG. 3 is a block diagram centered with respect to a split definition element shown in FIG. 2 which requires accumulation.

The block diagram of FIG. 3 which is centered with respect to the split definition element shows the maximum value as well as the minimum state of the system. The system is originally configured by repeatedly splitting one split definition element 11 (a data file which requires accumulation) to a main input 13 or a main output 15 until the split definition element 11 has an input 14 from another system, an input 12 from its own system, and an output 16 from its own system. As shown in FIG. 3, there are five types of FAL data streams. The split definition element 11 is a syntax definition element in the output definition element of F3 of the FAL data steam. The main input comprises the case where a split definition element is connected to a split definition element of interest by means of the data stream of F2 and F3 when splitting as an input of a syntax definition element in its own system, and the case where a syntax definition element in an output definition element of F3 within its own system is connected as an input to a split definition element of interest by means of the FAL data stream of F2 and F3. As can be seen from the diagram of the maximum FAL configuration, the syntax definition element which splits as an input exists at a point of input from its own system and a point of input from another system.

The input from another system comprises the case where a syntax definition element output from another system is linked as an input to a split definition element of interest by means of the FAL data stream of F2 and F3.

The input from its own system comprises the case where a semantic definition element within its own system is linked to a split definition element of interest by means of the data stream of F1, F2 and F3.

The main output comprises the case where a split definition element is linked as an output to a split definition element of interest by means of the FAL data stream of F2 and F3 when splitting as an output of a syntax definition element within its own system, and the case where a split definition element is linked, as an output from a split definition element of interest, to a syntax definition element of the output definition element of F3 within its own system by means of the FAL data stream of F2 and F3. As can be seen from the diagram of the maximum FAL configuration, the syntax definition element which splits as an output exists at a point of input from its own system and a point of input from another system.

The output from its own system comprises the case where a certain split definition element completes the FAL data stream of F2 and F3 within its own system. The output definition element of the FAL data stream of F3 is chiefly a semantic definition element. However, there are also a syntax definition element, which the user uses directly, and a syntax definition element connected to another system.

In FIG. 2, the split definition element is represented by a relatively large file image, and transient definition elements which do not need accumulation are represented by a small file image.

Assume that a split definition element t1 is one input point. In FIG. 2, data are accumulated in this definition element t1 from the input 12 from its own system via an FAL data stream of F1, F2, and F3. The definition element t1 is provided with a definition element K1 which is connected to the definition element t1 via one FAL data stream, a definition element K2 which is connected to the definition element t1 via two FAL data streams, and a definition element K3 which is connected to the definition element t1 via three FAL data streams.

The definition element t1 is further connected to another definition element t2 via one more FAL data stream. As with the definition element t1, this definition element t2 is also provided with the definition elements K1, K2, and K3. Similarly, the definition element t2 is further connected to definition elements t3 and t4 in that order, and each of these definition elements t3 and t4 is provided with the definition elements K1, K2, and K3. The definition elements are further connected to a definition element tn, as required.

Generally, one input point has four definition elements t1 to t4, and each definition element has three definition elements K1, K2, and K3 as output points. Hence, twelve output points are defined with respect to one input point. User's requirements for a program for a specific business are necessarily output to these twelve output points. This means that a maximum of twelve output points are sufficient for one input point. If there are input points more than twelve, an FAL configuration diagram is generated for each input point. In other words, various systems are present in a software region, and there are many FAL configuration diagrams which are in the maximum state, each of which is based on one input point.

Figure 6:
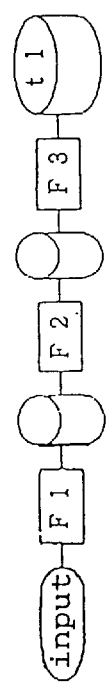
FIG. 6 is a schematic representation explaining the maximum FAL configuration shown in FIG. 2.
Figure 7:
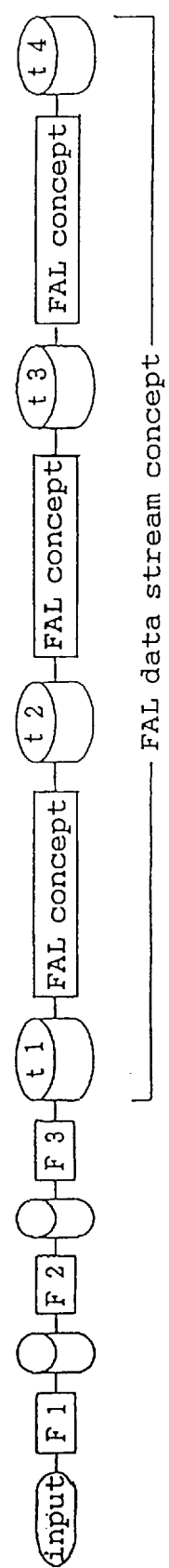
FIG. 7 is a schematic representation explaining the maximum FAL configuration shown in FIG. 2.
Figure 8:
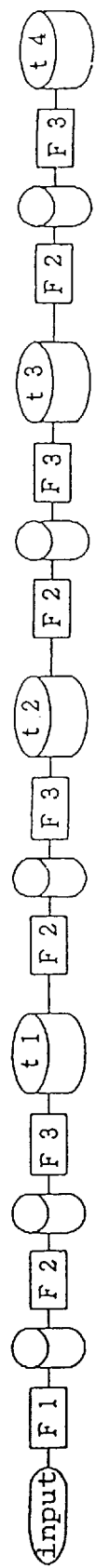
FIG. 8 is a schematic representation explaining the maximum FAL configuration shown in FIG. 2.

The maximum FAL configuration shown in FIG. 2 will now be described. As shown in FIG. 6, if one semantic definition element is input, there will be one FAL data stream which starts from the semantic definition element, and therefore the definition element t1 inevitably exists. As shown in FIG. 7, the FAL data stream has an optimizing structure for use in data processing. The application of a concept of this optimizing structure to the FAL configuration results in the optimizing structure for data processing using time accumulation with respect to the definition element t1. As shown in FIG. 8, the application of the FAL data stream (the case where a syntax definition element is input) to each of the FAL concepts shown in FIG. 7 results in the completion of the FAL configuration diagram for data processing utilizing time accumulation.

Figure 9:
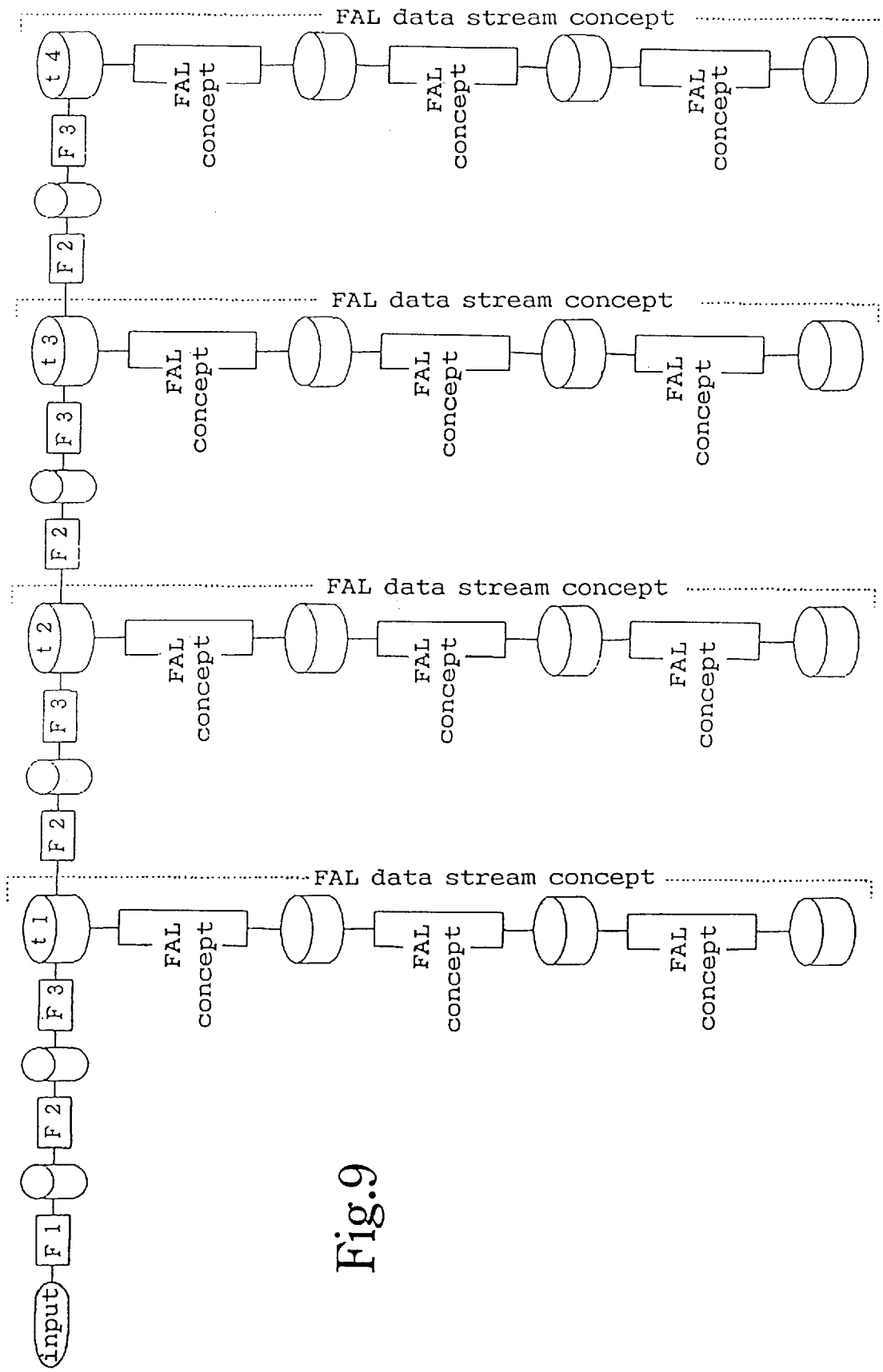
FIG. 9 is a schematic representation explaining the maximum FAL configuration shown in FIG. 2.
Figure 10:
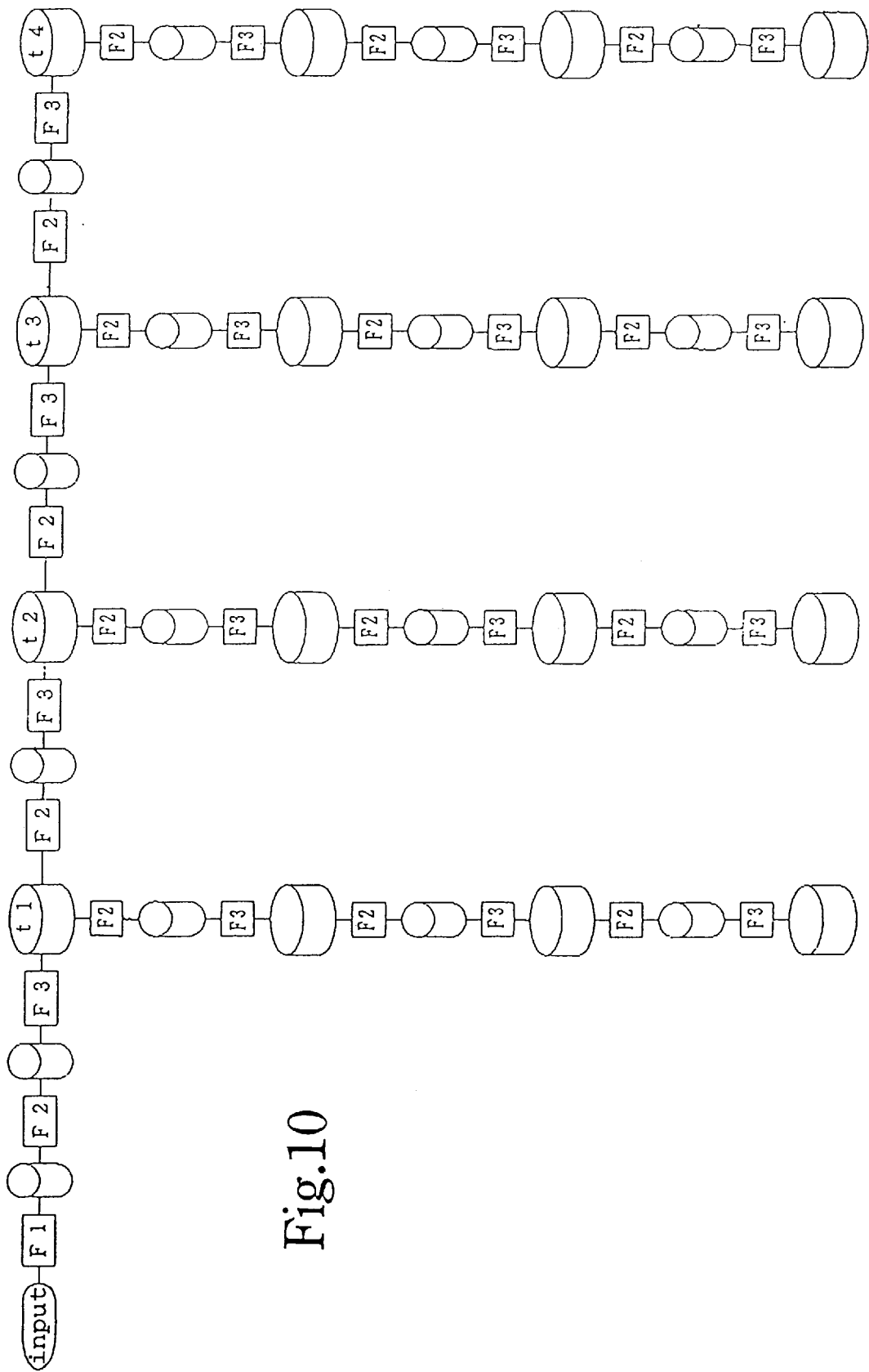
FIG. 10 is a schematic representation explaining the maximum FAL configuration shown in FIG. 2.

Further, as shown in FIG. 9, there is an optimizing structure for data processing which carries out processing using accumulation based on each of the definition elements t1, t2, t3, and t4 shown in FIG. 8 and outputs a definition element for an intended output point. As shown in FIG. 10, the FAL data stream (the case where the syntax definition element is input) is applied to each of the FAL concepts shown in FIG. 9.

A definition element for an intended output point is output from each point t shown in FIG. 10 by means of a maximum of three FAL data streams. There are the following three definition elements in order to output the definition element for an intended output point.

K1 does not need accumulation operation for processing based on definition elements t1, t2, t3, and t4 which represent time accumulation and outputs a definition element for an intended output point.

K2 needs one accumulation for processing based on the definition elements t1, t2, t3, and t4 which represent time accumulation and outputs a definition element for an intended output point.

K3 needs two accumulation operations for processing based on the definition elements, t1, t2, t3, and t4 which represent time accumulation and outputs a definition element for an intended output point.

FIG. 2 shows the maximum FAL configuration in which K1, K2, and K3 for each of t1, t2, t3, and t4 are represented.

Figure 4:
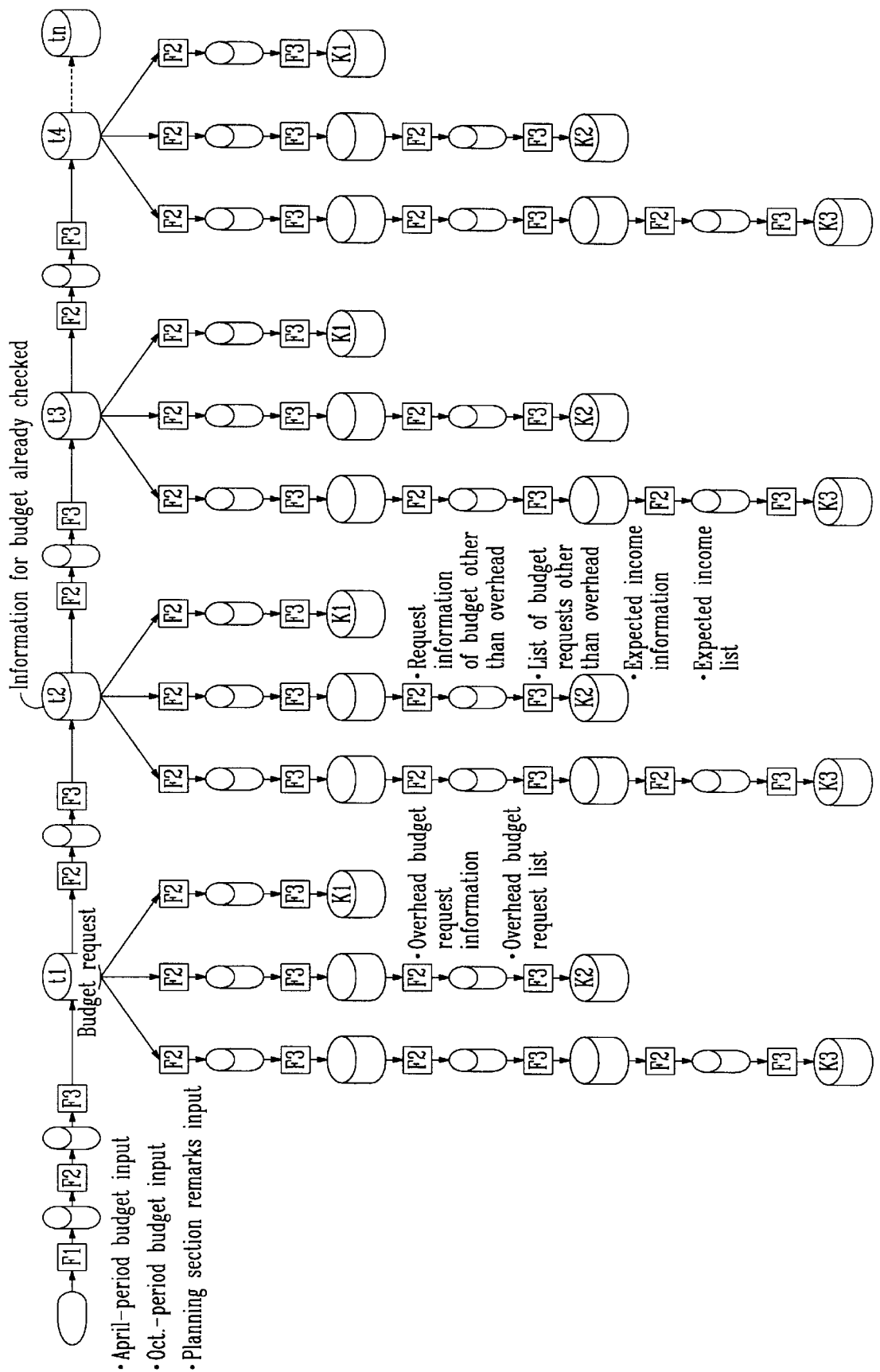
FIG. 4 is the maximum FAL configuration shown in FIG. 2 when applied to a specific user's request.

One example of a method of designing a program for budget management system use will be specifically explained. FIG. 4 is a diagram showing the maximum FAL configuration when corresponding to user's specific requirements. As shown in FIG. 4, input items comprise an April-period budget input, an October-period budget input, and an input of remarks of a planning section. The output definition element K1 of the definition element t1 is provided with an overhead budge request information and an overhead budget request list. The output definition element K1 of the definition element t2 is provided with information of a request of a budget other than the overhead, a list of a request of a budget other than the overhead, expected income information, and an expected income list. The other portions of the FAL configuration diagram shown in FIG. 4 are used in this example.

The array of the user's requirements is determined as follows. Output points (such as output forms) are furnished as the user's requirements, and each of the output points necessarily has time accumulation. The location of the point t is determined by arranging categories of the output points and the order of the categories. A definition element of the point t is specified based on the definition element of an output point belonging to each point t. Subsequently, definition elements of t3, t2, and t1 are specified based on a definition element of t4. t1 and semantic definition element are specified by the relationship between the definition element t1 which acts as an input point and a semantic definition element of an input. Based on the definition element t1 which acts as an input point, t2, t3, and t4 are sequentially specified. To cause each point t to output a definition element for an intended output point, a point K is determined by specifying the number of definition elements which need to be processed between each point t and the definition element of the output point.

Figure 5:
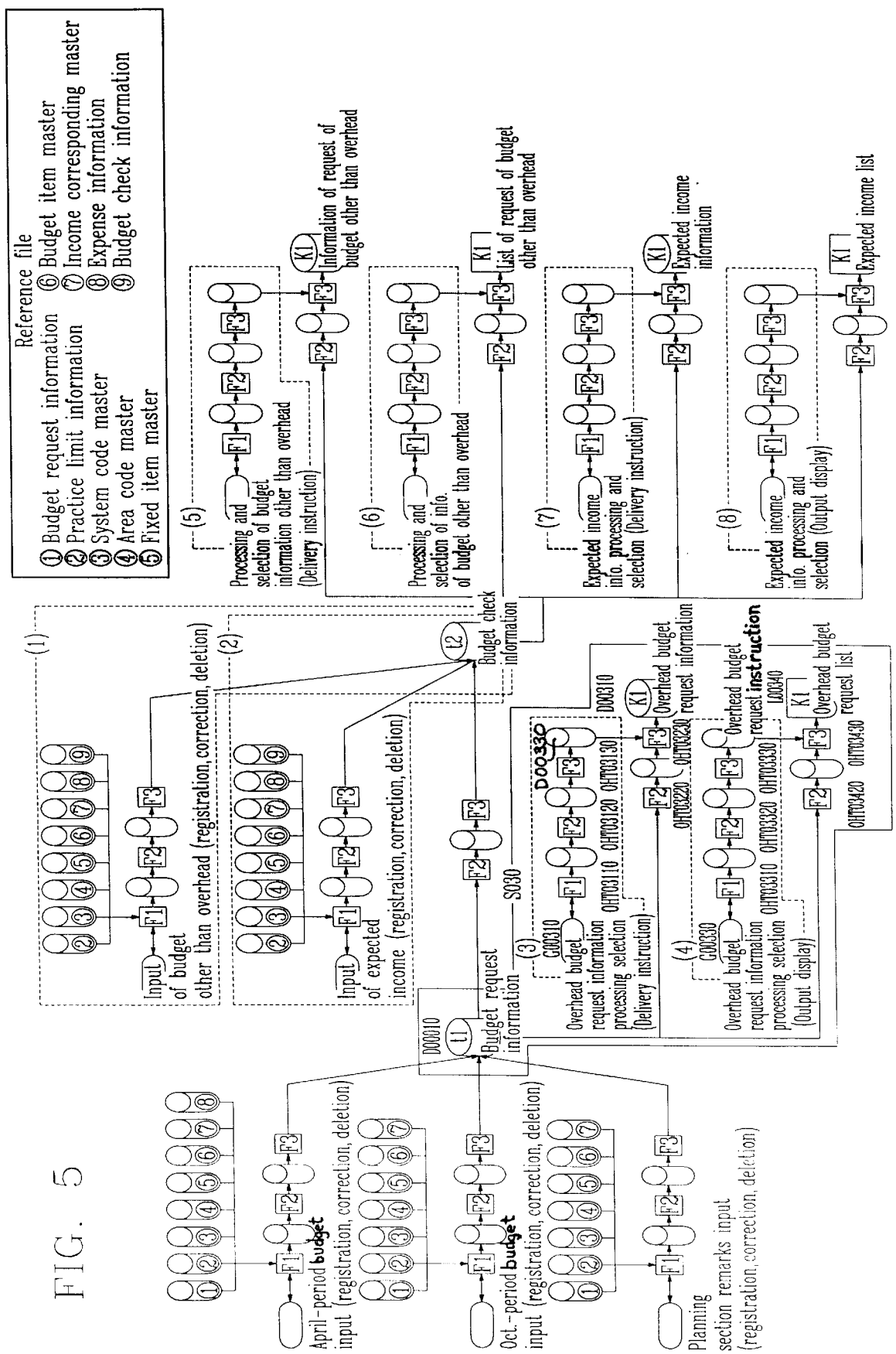
FIG. 5 is a schematic representation showing the necessary details of the FAL configuration shown in FIG. 4.

FIG. 5 shows details of the part of the FAL configuration required by the above example. Areas (1) and (2) surrounded by a broken line are the FAL data streams, shown in FIG. 3, for the split definition element t2. Areas (3) to (8) surrounded by a broke line are the FAL data streams linked to other input points. In this way, the FAL configuration diagram is generated, and FALs are generated one by one based on that FAL configuration diagram.

Figure 11:
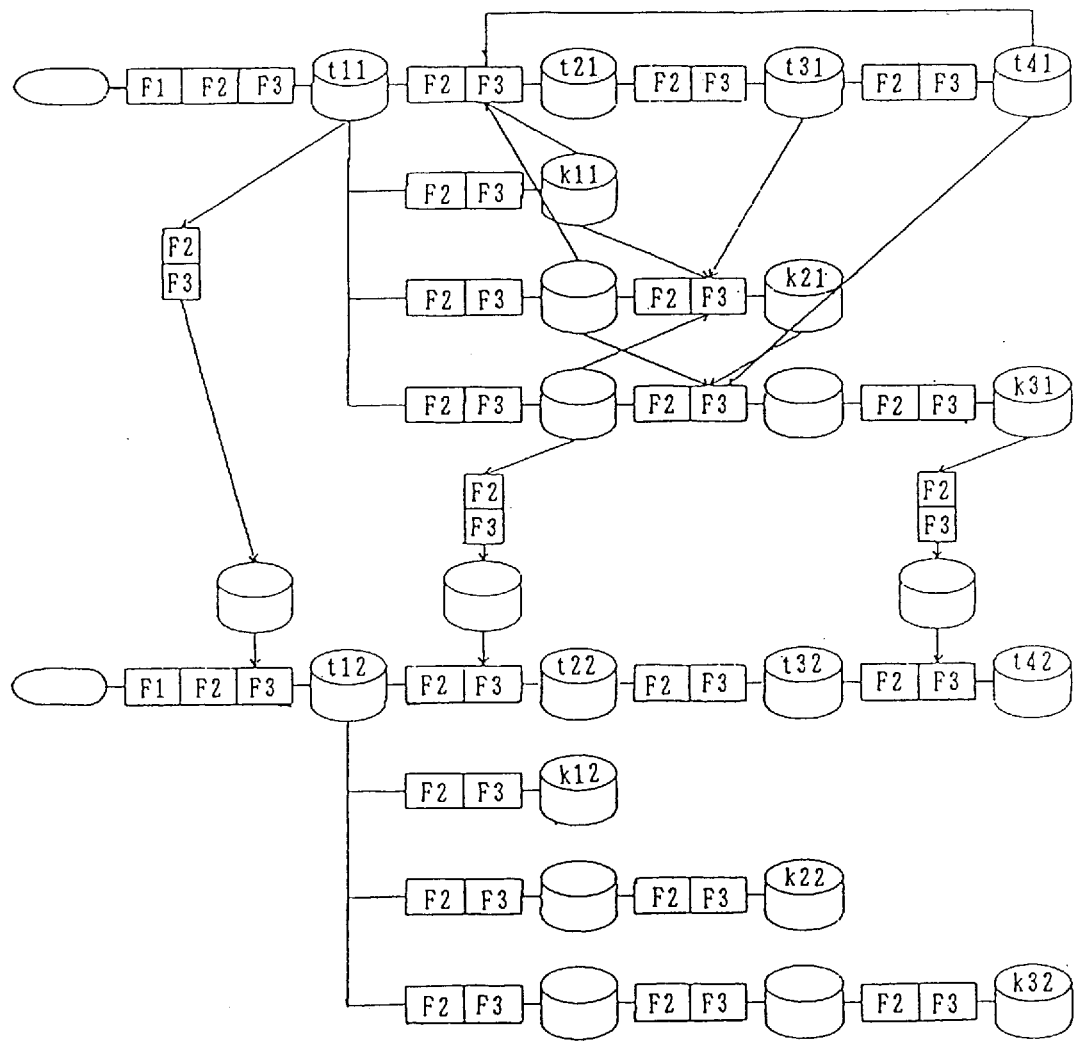
FIG. 11 is a diagram showing an example of the linking of definition elements starting from a point of input from its own system and an example of the linking of definition elements starting from a point of input from another system.
Figure 12A:
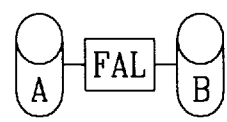
FIG. 12 shows various relationships between input and output definition elements for one FAL.
Figure 12B:
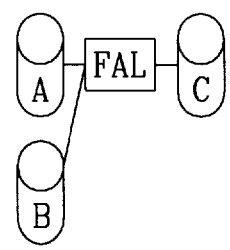
Figure 12C:
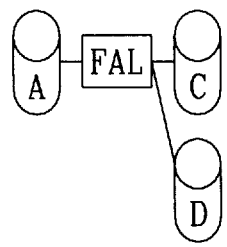
Figure 12D:
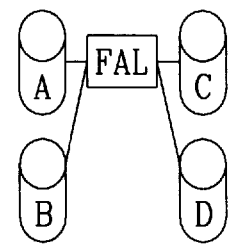

FIG. 11 is a diagram showing an example of the linking of definition elements starting from a point of an input starting from its own system and an example of the linking of definition elements starting from a point of an input from another system. As previously mentioned, a plurality of systems are present in the software region, and there are several maximum FAL configurations based on one input point. The overall configuration is established by combining the FAL configuration diagrams with each other. FIG. 11 shows one example of such combination of the FAL configuration diagrams. As shown in FIG. 11, as for one input point, an output definition element (syntax definition element) of F3 on the input point of interest can be input by all F1 and F3. The output definition element (syntax definition element) of F3 at another input point can be input using F1 and F3 by causing the FAL data stream of F2 and F3 to be interposed between the syntax definition element and the input point. If this FAL data stream can be directly input, it will not be expressed as the case may be.

As mentioned above, in generating all of the FALs necessary for a development event system, FAL configurations necessary for a specific business are extracted from the previously generated maximum FAL configuration, and each FAL is generated from this FAL configuration. As a result of this, it becomes possible to mechanically generate the best FAL configuration. This is attributable to the fact that FAL of the program designing method of the present invention does not include an application processing logic and hence FAL is not restricted by each application processing, which makes it possible to previously expect the maximum FAL configuration. The FAL data stream forms a unit of the software structure, and the collection of these FAL data streams results in the maximum FAL configuration. This makes it possible to define the most stable number of FALs and the location of definition elements.

Specific contents of each of FALs included in the optimum FAL configuration mechanically obtained by the above method, and specific contents of each of ASLs generated through steps which are independent of the steps of generating the FAL configuration are generated (refer to Unexamined Japanese Patent Publication No. Hei-6(1994)-332678 for a method of generating ASL). Finally, the FALs and ASLs are merged into one, thereby resulting in an object source program.

During the course of generating a source program by merging FALs and ASLs into one, an instruction to activate required ASL is incorporated into the FAL program. Such an instruction which shows the positions of ASLs is incorporated into the FAL program as an array of one link statement or a plurality of link statement so as to specify one or a plurality of necessary ASLs. One link statement includes the definition element of an ID (or an ID of a definition element item) and a data action function, whereby one ASL is specified. In other words, a link statement is a contrivance to take ASL into the system.

The form of a link statement used for FAL is as follows:
*L, definition element—ID, data action function *
(When a necessary definition item in the definition element is evident, the link statement may be expressed in the form of *L, item—ID, data action function which only specifies definition item—ID)

When the FAL is converted to a source program by merging operation, the above mentioned link statement is replaced by all ASLs which are generated by the link statement and specified definition items.

The number of link statements related to one FAL is sufficient to express all business requirements which may arise based on all input and output definition elements of that FAL. Conventionally, necessary link statements in the FAL program are manually determined, and the thus determined link statements are also manually arrayed in an appropriate order.

Contrary to this, according to the present invention, the number of required link statements and the array of the link statements in the FAL program are not manually but mechanically, i.e., automatically executed. Further, according to the present invention, the array of necessary link statements is univocally determined in one FAL program. With reference to FIGS. 12 to 25, a method of determining link statements of an FAL program of one FAL will be described.

FIG. 12 shows examples of various relationships between an input definition element and an output definition element for one FAL. FIG. 12a shows FAL having one input definition element A and one output definition element B, and FIG. 12b shows FAL having two input definition elements A and B, and one output definition element C. FIG. 12c shows FAL having one input definition element A and two output definition elements C and D, and FIG. 12d shows FAL having two input definition elements A and B, and two output definition elements C and D. Each of these FALs has a different relationship between the input definition element and the output definition element, and hence associated FAL programs, that is, arrays of link statements become different from each other.

To determined an array of the link statements of each FAL, the present invention utilizes a link statement matrix. The determination of link statements utilizing the link statement matrix is applicable to any one of FALs and also mechanically, i.e., automatically practicable.

Figures 13, 14:
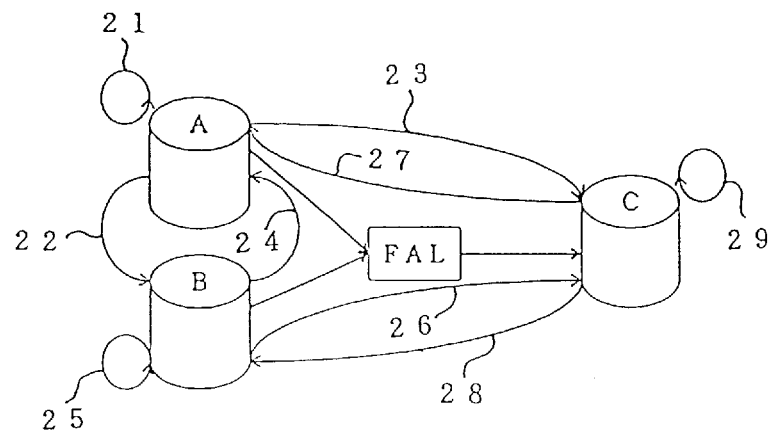
FIG. 13 is a schematic representation showing an example of FAL which has two input definition elements A and B and one output definition element C.
FIG. 14 is a table showing a link statement matrix of FAL shown in FIG. 13.

Using FAL having two input definition elements A and B and one output definition element C shown in FIG. 13, the characteristics of the link statement matrix will be described. The link statement matrix is a matrix-like table comprising all elements (boxes) of certain business requirements which may arise based on all the input and output definition elements of that FAL. In FIG. 13, each of possible business requirements 21–29 is designated by an arrow. The arrow shows the flow of a logic applied to a definition item from its logical starting point to its logical end point. Specifically, each of the business requirements is converted to a definition item located at the logical end point of the arrow by executing predetermined edition with respect to a definition item which belongs to a definition item located at the logical staring point of the arrow.

FIG. 14 is a table showing a link statement matrix for FAL shown in FIG. 13. FAL shown in FIG. 13 has three definition elements A, B, and C. The number of combinations of a pair of definition elements, which use any one of the definition elements A, B, C as the logical starting point and either of the other elements as the logical end point, is the same as the number of all business requirements mentioned above. The number of combinations of the pair of definition elements is the number of duplicate permutations of all definition elements obtained by combining the input definition elements with the output definition elements. In the link statement matrix shown in FIG. 14, a column represents definition elements which act as a logical staring point, and a row represents definition elements which act as a logical end point. Boxes 21–29 are arranged at intersections between the column of logical starting points and the row of logical end points, thereby constituting a matrix. The definition elements of the column and the definition elements of the row are equally arranged, and all input and output definition elements of this FAL are arranged in a predetermined order. The definition elements of the row and column are basically arranged in time sequence. Namely, an input definition element is inevitably arranged prior to an output definition element. If there are a plurality of input and output definition elements, they will be arranged in the order in which they are practically input and output. In this link statement matrix, each box corresponds to each business requirement. One semantic value which describes a corresponding business requirement is stored in each box. The semantic value is made by arranging a plurality of link statements necessary for implementing one or a plurality of data action functions corresponding to the business requirement in an appropriate order. In this way, the link statement matrix of FAL determines the number and position of semantic values.

Figure 15:
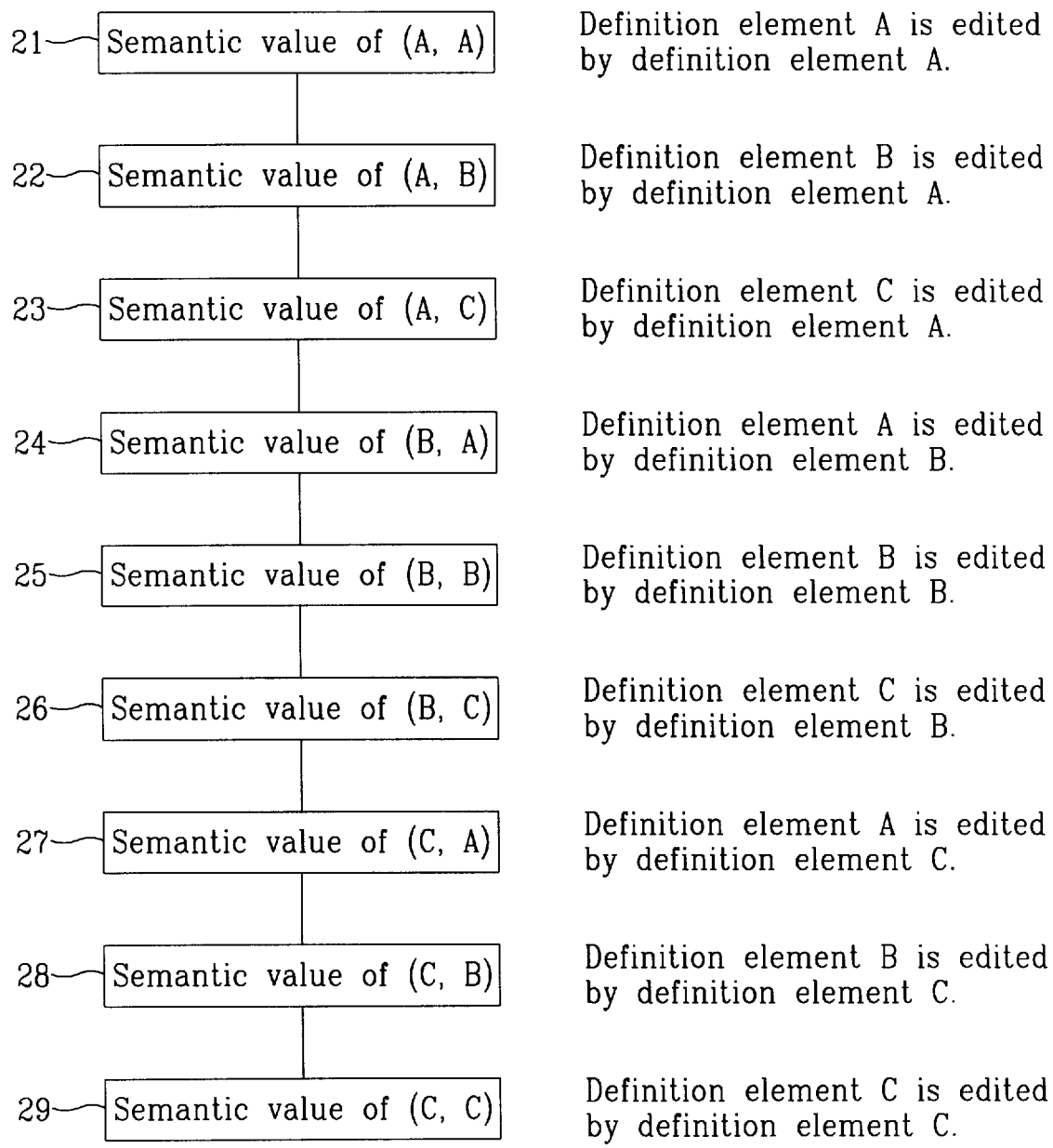
FIG. 15 is a diagram illustrating a semantic value stored in each of boxes of the link statement matrix shown in FIG. 14.

FIG. 15 is a chart illustrating semantic values stored in each of the boxes 21–29 of the link statement matrix shown in FIG. 14. For example, the box 21 holds a semantic value of a business requirement which edits an item of the definition element A to an item of the same definition element A. Specific contents of this semantic value are univocally and automatically defined if a definition element for the logical starting point and a definition element for the logical end point are determined.

FIG. 16 shows one example of specific contents of business requirements of each box in the link statement matrix. For example, contents of edition of a box (for example, boxes (A, A), (B, B)) made of an input definition element having the same logical staring and logical end point carry out self-check of data of that definition element. Moreover, contents of edition of a box located at an intersection between the logical starting point of the input definition element A and the logical end point of an output definition element C carry out edition from the input definition element A to the output definition element C. Some boxes in the link statement matrix are substantially meaningless. For example, a box defined by the logical starting point of the output definition element C and the logical end point of the input definition element A is vacant. Usually, business requirements having these logical starting and end points are inconceivable. Even if such a vacant box is present in the matrix, the application of the link statement matrix of the present invention will have no problem. In FIG. 16, numerals 1–9 provided to the boxes represent the order of unwinding of each box in the link statement matrix. The order of unwinding of the link statement matrix is to link together semantic values of each box of the link statement matrix in a predetermined order. The order of the unwinding operation will be described in detail later.

A link statement matrix for each FAL of F1, F2, and F3 of the FAL data stream will be shown.

Figures 17, 18:
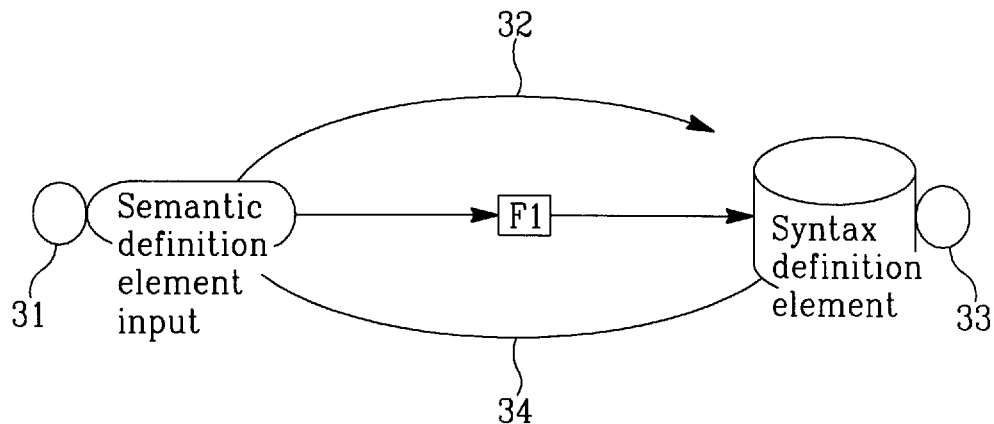
FIG. 17 is a schematic representation showing F1, associated definition elements, and possible application requirements a–d.
FIG. 18 is a table showing a link statement matrix in the case of F1 as shown in FIG. 17.

FIG. 17 is a schematic representation showing F1, associated definition elements (two definition elements, that is, a semantic definition element (input) and a syntax definition element), and possible business requirements 31 to 34. FIG. 18 is a table showing a link statement matrix concerning F1 shown in FIG. 17. For example, the box 31 of the link statement matrix shown in FIG. 18 holds a semantic value which describes business requirements having semantic definition elements (input) as the logical starting and end points. One semantic value is usually made of concepts of a plurality of data action functions. The concept of data action function is a group of several instructions for implementing one data action function, and includes a branch instruction relating to a control logical value in addition to the link statement for the data action function. The group of instructions corresponding to the concept of one data action function is referred to as a link statement unit sequence. This link statement unit sequence will be specifically described later.

The data action function is a logical segment which forms a logic of the ASL program. There are five types of data action function; namely, S1, S2, S3, S4, and S5. The transition of a data status in a computer is always included in any one of these data action functions. S1 is an input condition check, S2 is an existence tolerance check, S3 is a logical verification check, S4 is a processing moving function, and S5 is a definition element input and output processing function. Details of these functions are disclosed in Unexamined Japanese Patent Publication No. Hei-6 (1994)-33267 set forth above.

The range of the data action function to which the link statement matrix is applied does not include S5. The link statement matrix comprises a data action function which edits data in given memory to data in another memory (or the same memory), whereas S5 is a data action function which controls transmission between a physical storage device and memory. S4 is included in the concept of another data action function in the semantic values in association with a branch instruction. Accordingly, three concepts, that is, a concept S1, a concept S2, and a concept S3 are exist as the concept of the data action function of the semantic values which is applied as the link statement matrix.

Semantic values of each box in the link statement matrix assume an array of concepts of necessary data action functions. The box 31 shown in FIG. 18 is made up of the concepts S1, S2, and S3, and boxes 32, 33, and 34 are made up of the concepts S2 and S3. The concept S1 is only applied to an input of a semantic definition element and hence exists only in the FAL program of F1.

Figures 19, 20:
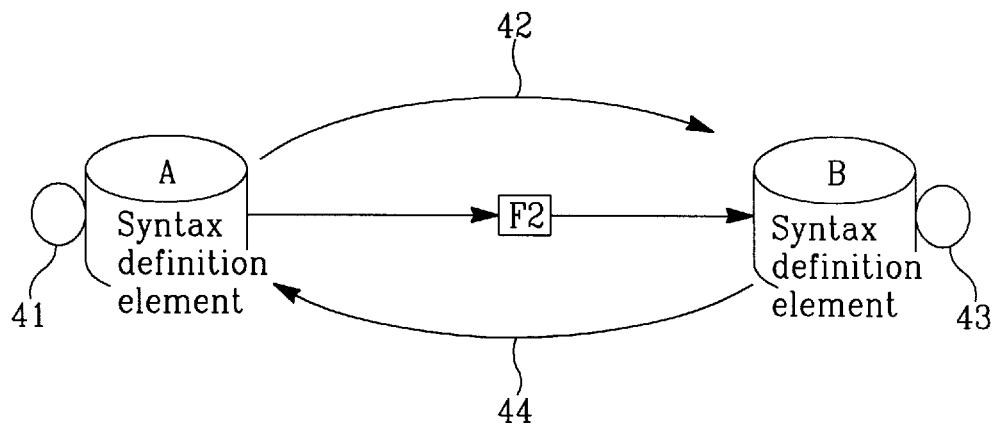
FIG. 19 is a schematic representation showing F2, associated definition elements, and possible application requirements a–d.
FIG. 20 is a table showing a link statement matrix in the case of F2 as shown in FIG. 19.

FIG. 19 is a schematic representation showing F2, associated definition elements (both of which are syntax definition elements), and possible business requirements 41 to 44. FIG. 20 shows a link statement matrix for F2 shown in FIG. 19. Each box is made of the concepts S2 and S3.

Figures 21, 22:
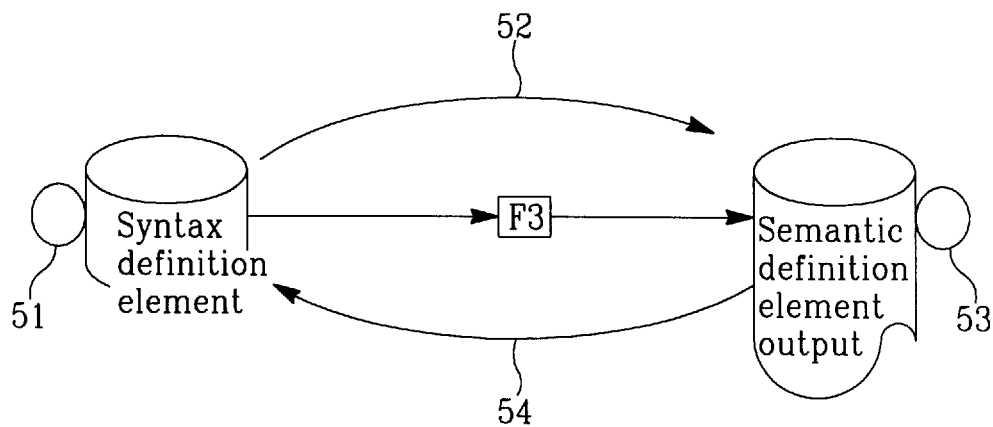
FIG. 21 is a schematic representation showing F3, associated definition elements, and possible application requirements a–d.
FIG. 22 is a table showing a link statement matrix in the case of F3 as shown in FIG. 21.

FIG. 21 is a schematic representation showing F3, associated definition elements (two definition elements, that is, a syntax definition element and a semantic definition element (output)), and possible business requirements 51 to 54. FIG. 22 shows a link statement matrix for F3 shown in FIG. 21. Each of the boxes is made of the concepts S2 and S3.

Figure 23:
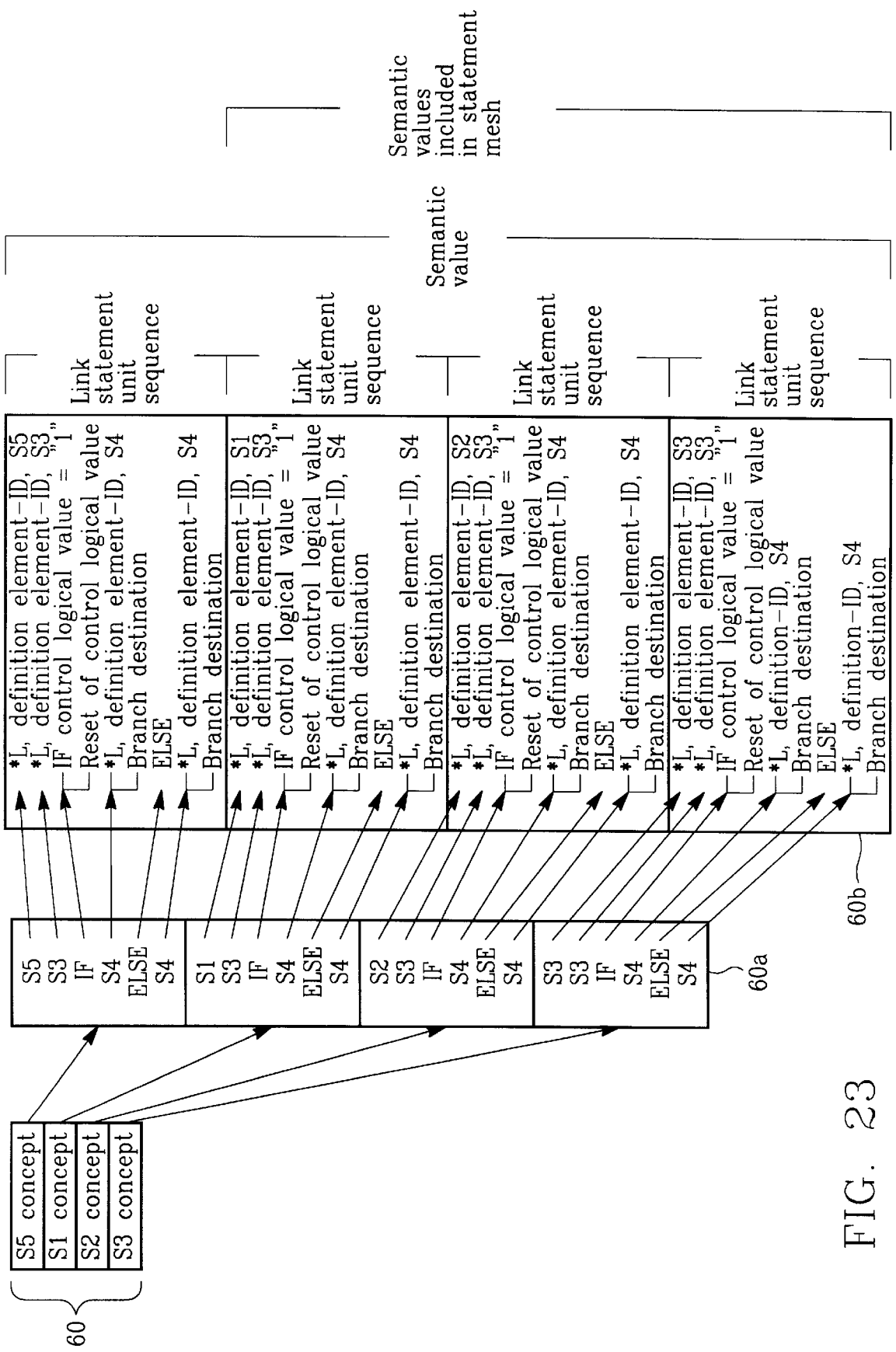
FIG. 23 is a diagram specifically showing contents of the concept of each data action function which forms a general semantic value.

FIG. 23 is a diagram specifically showing contents of the concept of each of data action functions which form a general semantic value. Reference numeral 60 shows the concept of each data action function. S5 is one of concepts of data action functions of the semantic value which is not included in the link statement matrix. Reference numeral 60a shows contents of the link statement unit sequence corresponding to the concept of each data action function. These contents include a branch instruction relating to a control logical value of FAL in addition to the data action function. Contents of the link statement sequence are publicly known, and hence the semantic value is univocally determined so long as the concepts of the data action functions forming that semantic value are defined. Reference numeral 60b represents contents of each link statement sequence using a practical link statement form. As previously mentioned, there are three concepts as constituent elements of the semantic value included in the link statement matrix, that is, the concepts S1, S2, and S3.

FIG. 24 shows a link statement matrix applied to general FAL having a number of inputs "n" and a number of outputs "m". The total number of boxes in this link statement matrix is a duplicate permutation (n+m) $II_2$, i.e., $(n+m)^2$. Each box holds a semantic value (S/V) which is univocally and mechanically determined by input and output definition elements of that box. In this way, the link statement matrix is automatically generated.

The semantic values of the boxes are linked together in an appropriate manner to compose the FAL program. FIG. 25 shows the order of linking of semantic values of the boxes. Assume that the location of each box in the link statement matrix is expressed by coordinates (x, y) which consist of x=the order of a definition element for the logical starting point and y=the order of a definition element for the logical end point. The order of linking of the semantic values is given by the following generation equations (1) to (6).

$$\text{Suppose} x<n,\ y<n,\ \text{and} x<y, n(x-1)+(n+1)-y=nx+1-y, \quad (1)$$

$$\text{Suppose} x<n,\ y<n,\ \text{and} x<y, n(x-1)+(n+2)-y=nx+1-y, \quad (2)$$

$$\text{Suppose} x=y<n, n(x-1)+1, \quad (3)$$

$$\text{Suppose} x=y>n, (x-1)^2+1, \quad (4)$$

$$\text{Suppose} x>y\ \text{and} x>n, (x-1)^2+y+1,\ \text{and} \quad (5)$$

$$\text{Suppose} y>x\ \text{and} y>n, y^2-(x-1). \quad (6)$$

In the link statement matrix shown in FIG. 16, the numerals given to the boxes which represent the order of unwinding of the link statement matrix is derived from the above generation equations. In this way, the above generation equations allow univocal and mechanical determination of the order of unwinding of semantic values of boxes in the link statement matrix. Thus, the semantic values are linked together in a predetermined order, whereby the FAL program is completed.

POSSIBILITY OF INDUSTRIAL UTILIZATION

According to the present invention, as previously mentioned, an FAL configuration necessary for a specific business is extracted from the previously generated maximum FAL configuration when FAL necessary for a system is generated. Each FAL is generated from this maximum FAL configuration, and hence the best FAL configuration can be mechanically generated.

After the FAL configuration has been generated, a link statement matrix is generated for each FAL. A semantic value is stored in each box of the link statement matrix, and the thus stored semantic values are linked together in a predetermined order, whereby each FAL program can be composed.

The course of the generation of a FAL configuration, the course of the generation of a FAL program by generating a link statement matrix for each FAL, and the course of the generation of a source program following these processes, can be automatically executed, and also results of the operations are mechanically and univocally obtained. Accordingly, these processes can be continuously executed. As a matter of course, these processes include neither steps of manual operations of a programmer nor steps which depend on the skill and intention of the programmer. As a result of this, it is possible to efficiently design an application-oriented program without errors irrespective of the level of skill of each engineer.

What is claimed is:

1. An application-oriented program computer implemented designing method including the steps of:

extracting each definition item which is to be processed by an application processing system for specific applications, generating a program segment (ASL) with a single function associated with each definition item in a form in which a corresponding definition item is used as a keyword and ASLs are control-independent of each other, separately generating a control program (FAL) which combines ASLs with each other in an organic manner by operating and controlling the group of ASLs, and producing a source program which satisfies a required application processing function by starting each necessary ASL using an array of link statements included in FAL, and by merging ASL and FAL into one, the improvement being characterized by comprising the steps of:

extracting an FAL configuration necessary for a specific application from the previously generated maximum FAL configuration when FAL necessary for the processing system is generated;

generating each FAL from the thus extracted FAL configuration; and wherein the maximum FAL configuration is an aggregate of a plurality of FAL data streams which are made by: dividing FAL into three types, that is, FAL (F1) which controls an original input, FAL (F2) which processes input data for a certain purpose, and FAL (F3) which produces a final output, as an element which gives the order of the occurrence of events to a definition element made of an aggregate of the definition items; and interposing F1 between a first definition element and a second definition element, F2 between the second definition element and a third definition element, and F3 between the third definition element and a fourth definition element.

2. The application-oriented program designing method as defined in claim 1, wherein the array of a plurality of link statements included in FAL which is used for merging FAL and ASL into one is automatically determined by the steps of:

generating a link statement matrix from the aggregate of definition elements consisting of all input and output definition elements associated with one FAL in such a way that each combination of a pair of definition elements is arranged corresponding to each box of the link statement matrix in order to provide all combinations of the pair of definition elements obtained as a result of duplicate permutation, in which one of the definition element pair serves as a logical starting point and the other as a logical end point;

storing each semantic value including a plurality of link statements univocally, each of which is determined by the combination of a definition element serving as a logical starting point with another definition element serving as a logical end point, in each of boxes of the link statement matrix; and concatenating the semantic values with each other in a predetermined order.

3. The application-oriented program designing method as defined in claim 2, wherein one semantic value is made of a plurality of link statement unit sequences each of which includes a plurality of link statements and branch instructions to implement one data action function.

4. The application-oriented program designing method as defined in claim 3, wherein the predetermined order for concatenating the semantic values which form the link statement mesh is univocally set based on a generation equation.

* * * * *